US009816417B2

(12) United States Patent
Corliss, II

(10) Patent No.: US 9,816,417 B2
(45) Date of Patent: Nov. 14, 2017

(54) METHOD FOR TREATING AN EXHAUST GAS

(71) Applicant: Dorian Francis Corliss, II, Murrieta, CA (US)

(72) Inventor: Dorian Francis Corliss, II, Murrieta, CA (US)

( * ) Notice: Subject to any disclaimer, the term of this patent is extended or adjusted under 35 U.S.C. 154(b) by 0 days.

(21) Appl. No.: 15/089,513

(22) Filed: Apr. 2, 2016

(65) Prior Publication Data

US 2017/0284252 A1    Oct. 5, 2017

(51) Int. Cl.
| | | |
|---|---|---|
| *F01N 3/00* | (2006.01) | |
| *F01N 3/20* | (2006.01) | |
| *B01D 53/94* | (2006.01) | |
| *F02D 41/02* | (2006.01) | |
| *F01N 13/00* | (2010.01) | |
| *F01N 3/02* | (2006.01) | |

(52) U.S. Cl.
CPC ......... *F01N 3/206* (2013.01); *B01D 53/9477* (2013.01); *F01N 3/02* (2013.01); *F01N 13/009* (2014.06); *F02D 41/0295* (2013.01); *B01D 2255/904* (2013.01)

(58) Field of Classification Search
USPC ......... 60/274, 289, 290, 291, 292, 293, 295, 60/298, 299, 320
See application file for complete search history.

(56) References Cited

U.S. PATENT DOCUMENTS

| | | | | |
|---|---|---|---|---|
| 3,757,521 A |  | 9/1973 | Tourtellotte | |
| 5,603,215 A | * | 2/1997 | Sung | B01D 53/944 60/274 |
| 6,171,556 B1 | * | 1/2001 | Burk | B01D 53/9481 422/171 |
| 6,722,125 B1 | * | 4/2004 | Pfalzgraf | F01N 3/0814 60/274 |
| 7,628,008 B2 | * | 12/2009 | Ranalli | B01D 53/8653 60/278 |
| 7,673,447 B2 | * | 3/2010 | Gaiser | F01N 3/0256 60/284 |
| 8,578,704 B2 |  | 11/2013 | Gehret | |
| 2011/0265451 A1 | * | 11/2011 | Gehret | F01N 3/0205 60/274 |

FOREIGN PATENT DOCUMENTS

EP    2397216    12/2011

OTHER PUBLICATIONS

Jean P. Roy, Exhaust Temperature Control Enhances Dual Stage Catalyst System Performance on Engines Fueled with Low-Pressure Gas, SAE International, Sep. 10, 2012, 18 pages.
M. Defoort, The Effect of Air-Fuel Ratio Control Strategies on Nitrogen Compound Formation in Three-way Catalysts, Int. J. Engine research, Aug. 6, 2003, vol 5 issue 1.

* cited by examiner

*Primary Examiner* — Binh Q Tran

(57) ABSTRACT

A provision of assemblies and methods for treating an exhaust gas from an internal combustion engine. The treatment method comprises at least two catalyst stages. The exhaust gas is directed to a first stage catalyst. After the first stage catalyst, the exhaust is passed to an inter-catalyst stage comprising an exhaust cooling process and an oxygen enrichment process. Next, the exhaust is passed to a second stage catalyst for reducing carbon monoxide, ammonia and hydrocarbon concentration in the exhaust gas, before exiting via an outlet.

24 Claims, 2 Drawing Sheets

METHOD FOR TREATING AN EXHAUST GAS

CROSS-REFERENCE TO RELATED APPLICATIONS

This application claims the benefit of U.S. provisional patent application Ser. No. 62/143,182, filed on Apr. 5, 2015, by the present inventor. This application claims the benefit of U.S. provisional patent application Ser. No. 62/317,425, filed on Apr. 1, 2016, by the present inventor.

BACKGROUND

The operation of combustion devices and particularly internal combustion (IC) engines produces small amounts of air contaminants such as carbon monoxide (CO), nitrogen oxides (NO, $NO_2$, or generally $NO_x$), hydrocarbons (HC) and ammonia in exhaust gas. Carbon monoxide, $NO_x$, and ammonia are problematic air pollutants and their emission levels are regulated within certain limits in many geographical regions. $NO_x$ emissions are of particular concern. In some areas, significant $NO_x$ reductions are needed in order to meet National Ambient Air Quality Standards (NAAQS). Ammonia is a regulated toxic air contaminant and a precursor for the formation of particulate matter. Some regulatory agencies assess fees for certain ammonia emissions. Equipment with ammonia emissions can be subject to Best Available Control Technology (BACT) requirements and Best Available Control Technology for Toxics (TBACT) requirements. Particulate matter is an air contaminant and a carcinogen.

For smaller engines (less than 1000 HP), commonly adopted exhaust gas treatment post-combustion involves a single stage catalyst system. In some areas, it is not unusual for engines with exhaust treatment systems employing single stage catalysts to frequently exceed their regulated emission limits. For an engine to be in compliance, the air to fuel ratio must be within a narrow range. Air to fuel ratio controllers (AFRCs) control the air to fuel ratio with the use of an oxygen sensor. However, oxygen sensors can be affected by a number of factors such as exhaust temperature, engine load changes, unburned methane in the exhaust, ambient humidity, oxygen sensor age and other factors that might affect oxygen sensor output. Oxygen sensor "drift" or incorrect oxygen sensor signal is a major cause for noncompliance with emission standards. Oxygen sensor "drift" is a particular problem for engines that operate at variable load.

Some engines employ Selective Catalytic Reduction (SCR) systems to control emissions. These systems have a number of disadvantages, especially for smaller engines. SCR catalysts usually contain large quantities of rare precious metals and require regular replacement. SCR systems require the storage, handling and pumping of hazardous chemicals such as ammonia or urea which can subject the corresponding facilities to stringent regulatory requirements. Therefore, a system to control dosing of ammonia or urea is needed. Ammonia emissions from engine systems with SCR are frequently regulated. Inappropriate dosing can lead to toxic ammonia emissions exceeding regulatory limits. Further, the SCR systems can require frequent maintenance and specialized technicians.

Previously, there was experimentation with two stage catalyst systems involving injection of air between the two catalyst stages. Despite the complexity of two catalysts, these systems did not result in markedly improved emission control and, in fact, the two stage catalyst system could result in generation of $NO_x$ on or in communication with the second stage catalyst.

SUMMARY OF THE INVENTION

The present invention is broadly a provision of assemblies and methods for treating an exhaust from internal combustion engines. In an embodiment, the exhaust is passed through a first stage catalyst where air contaminants are reduced, then through an inter-catalyst stage where the exhaust may undergo oxygen enrichment and cooling, and then through a second stage catalyst where air contaminants may be further reduced. Potential air contaminants such as $NO_x$, CO, and hydrocarbons are substantially reduced in concentration by the present method. Ammonia concentration in exhaust gas can also be substantially reduced by the present invention. The generation of $NO_x$ on or in the second stage catalyst is substantially reduced.

In one aspect, the invention is directed toward a method for treating an exhaust gas discharged from a rich-burn, spark ignited engine, comprising: (a) controlling combustion of air-fuel mixture to produce an exhaust gas that is substantially free of oxygen; (b) passing the exhaust gas from the engine to a first stage catalyst for substantially reducing nitrogen oxide ($NO_x$) and carbon monoxide concentration in the exhaust gas; (c) passing the exhaust gas resulting from step (b) to an inter-catalyst stage having an oxygen enrichment process wherein oxygen containing gas is discontinuously injected at an injection point into the exhaust gas, and an exhaust cooling process wherein the exhaust gas is cooled to a predetermined temperature for inhibiting the generation of $NO_x$ in the second stage catalyst; and (d) passing the exhaust gas resulting from step (c) to a second stage catalyst for substantially reducing carbon monoxide concentration and optionally reducing ammonia concentration in the exhaust gas, before exiting via an outlet. As a result of the method, the concentration of $NO_x$, carbon monoxide, and hydrocarbons in the treated exhaust gas that exits the second stage catalyst is substantially reduced.

Implementations of the method may include one or more of the following.

A method wherein the oxygen content of the exhaust gas downstream of the injection point is intermittently less than 0.24% and not greater than about 1.35% as a result of discontinuous injection of oxygen containing gas. A method wherein an engine control device receives signals from two or more oxygen sensors wherein one oxygen sensor is placed upstream of the first stage catalyst and a second oxygen sensor is placed downstream of the inter-catalyst stage. A method wherein the exhaust cooling process cools the exhaust to a temperature range of 380 to 650 degrees Fahrenheit. A method wherein the generation of $NO_x$ by the oxidation of ammonia in the second stage catalyst is substantially limited when second stage exhaust gas temperature is less than 480 degrees Fahrenheit. A method wherein intermittently discontinuing the injection of oxygen containing gas lowers the oxidation state of noble metals, which comprise the second stage catalyst. A method wherein the engine air-fuel ratio is dithered thereby reducing the amount of ammonia exiting the first stage catalyst. A method wherein the concentration of ammonia in the treated exhaust that exits the second stage catalyst is less than 2.0 ppm corrected to 15% oxygen based on time-average data taken over an extended period. A method wherein the injection of oxygen containing gas is briefly ceased at a frequency of every 0.4 to 40 seconds. A method wherein the injection of oxygen containing gas is briefly ceased at a frequency of every 40 seconds to 15 minutes. A method wherein the concentration of $NO_x$ in the treated exhaust that exits the second stage catalyst is less than 3.7 ppm corrected to 15% oxygen based on time-average data taken over an extended period. A method wherein the concentration of carbon monoxide in the treated exhaust that exits the second stage catalyst is less than 8.3 ppm corrected to 15% oxygen based on time-average data taken over an extended period. A method wherein the concentration of carbon monoxide in the treated exhaust that exits the second stage catalyst is less than 6.7 ppm corrected to 15% oxygen based on time-average data taken over an extended period. A method wherein the concentration of carbon monoxide in the treated gas that exits the second stage catalyst is less than 5.0 ppm corrected to 15% oxygen based on time-average data taken over an extended period. A method wherein the concentration of carbon monoxide in the treated exhaust exiting the first stage catalyst is less than 625 ppm corrected to 15% oxygen based on time-average data taken over an extended period. A method wherein the exhaust cooling process cools the exhaust to a temperature range of 380 to 500 degrees Fahrenheit. A method wherein the concentration of ammonia in treated exhaust that exits the second stage catalyst is less than 3.0 ppm corrected to 15% oxygen based on time-average data taken over an extended period. A method wherein the oxygen enrichment process comprises injection of oxygen containing gas through a plurality of injection ports. A method wherein the concentration of a precursor for particulate matter is reduced in the exhaust gas exiting the second stage catalyst. A method wherein the air to fuel ratio of the engine is controlled by a system utilizing a venturi mixer and an electronically controlled valve.

DETAILED DESCRIPTION OF THE INVENTION

Definition of Terms

"Exhaust cooling process" refers to a device that functions to control the temperature of an exhaust gas and is located within the inter-catalyst stage.

"First stage catalyst" refers to a first catalyst in the path of an exhaust after the exhaust leaves an engine.

"Second stage catalyst" refers to a first catalyst in the path of the exhaust after an inter-catalyst stage.

"$NO_x$" refers to nitrogen oxides including NO and $NO_2$.

"Discontinuous" means not constant or not continuous.

"Dithering" refers to oscillating the air to fuel ratio around a set point.

"Parts per million (ppm)" refers to parts per million by volume.

"Cleaning period" refers to a period up to 30 minutes in duration.

"Inter-catalyst stage" refers to a device containing an exhaust cooling device and an oxygen enrichment device.

"Oxygen containing gas" refers to a gas containing oxygen and consisting of air, oxygen gas, oxygen containing exhaust gas, or mixtures of those gases and nitrogen gas, exhaust gas, carbon dioxide and/or oxygen containing gases, which will not contribute to pollutant generation known to those skilled in the art.

"Oxygen enrichment process" refers to a device that injects oxygen containing gas into exhaust gas at an injection point.

Figure 1:
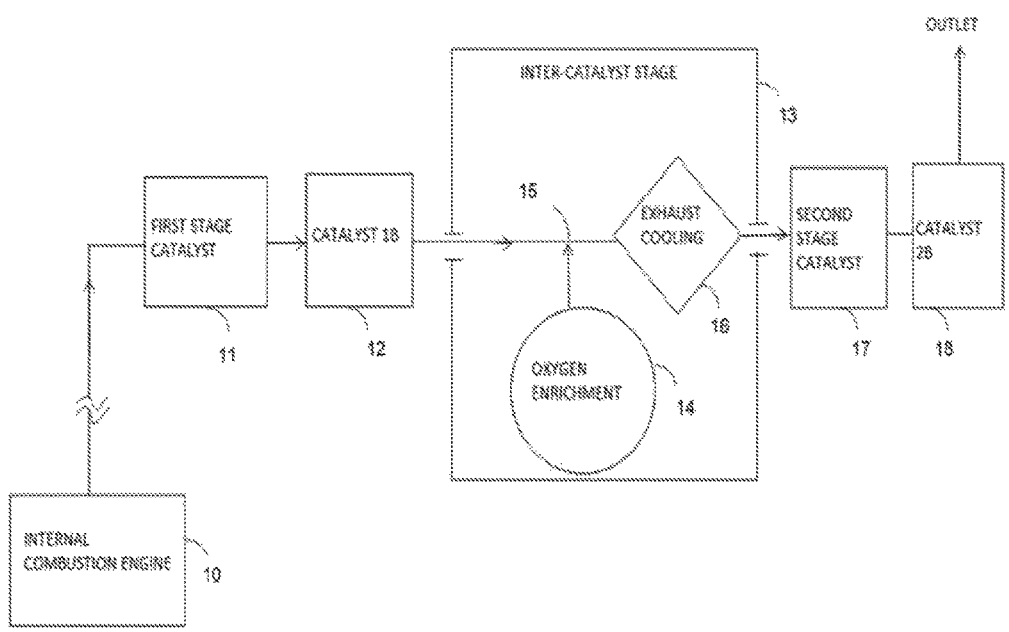
FIG. 1 is a block diagram showing an embodiment of an exhaust treatment system.

FIG. 1 shows an embodiment of an internal combustion engine 10 from which an exhaust gas is directed through a conduit to a first stage catalyst 11. Typically, this catalyst will be a three-way catalyst. After the exhaust gas has exited the first stage catalyst 11, it then optionally passes through Catalyst 1B 12. Next, the exhaust is passed to an inter-catalyst stage 13 in which an exhaust cooling process 16 and an oxygen enrichment process 14 take place. For oxygen enrichment, oxygen-containing gas is discontinuously injected into the exhaust at an injection point 15. After the inter-catalyst stage 13, the exhaust is passed to the second stage catalyst 17. Typically, the second stage catalyst 17 will be a three-way catalyst. Next, the exhaust optionally passes through Catalyst 2B 18 before being directed to an outlet for emission of the treated exhaust into the atmosphere.

In more detail, still referring to FIG. 1, the exhaust gas exiting the internal combustion engine 10 is usually greater than 750 degrees Fahrenheit and is substantially free of oxygen. In an embodiment, the oxygen content of the exhaust gas exiting the engine is 0.0 ppm. In an embodiment, the oxygen content of the exhaust gas exiting the engine is less than 10 ppm. In an embodiment, the oxygen content of the exhaust gas exiting the engine is less than 50 ppm. The exhaust gas, after optionally being used in other processes, will then be directed through a conduit to the first stage catalyst 11 where nitrogen oxides and carbon monoxide will be significantly reduced. In an embodiment, the $NO_x$ content of exhaust gas passing through the first stage catalyst 11 is reduced by 97% or more. In an embodiment, the $NO_x$ content of exhaust gas passing through the first stage catalyst 11 is reduced to less than 3.7 ppm corrected to 15% oxygen. In an embodiment, the carbon monoxide content of exhaust gas that passes through the first stage catalyst 11 is reduced to less than 625 ppm corrected to 15% oxygen. The first stage catalyst 11 will reduce the concentration of hydrocarbon in the exhaust which passes through it. Next, the exhaust optionally passes through Catalyst 1B 12.

Exhaust is next passed to the inter-catalyst stage 13 where the exhaust cooling process 16 cools the exhaust to 380 to 650 degrees Fahrenheit. In an embodiment, the exhaust gas is cooled to a range of 380-500 degrees Fahrenheit. In an alternative embodiment, the exhaust gas is cooled to a range of 550-650 degrees Fahrenheit. The oxygen enrichment process 14 takes place in the inter-catalyst stage 13. The order of the exhaust cooling process 16 and oxygen enrichment process 14 can be reversed. In the oxygen enrichment process 14, oxygen-containing gas is discontinuously injected into the exhaust such that the oxygen concentration of exhaust gas downstream of the injection point 15 is intermittently less than 0.24% and not greater than 1.35%. In an embodiment, the oxygen concentration of exhaust gas is measured less than 8 inches downstream of the injection point. The quantity, duration and frequency of injection of oxygen containing gas can be controlled with an air blower, air tank, valves and other equipment known to those with skill in the art.

Next, exhaust is directed to the second stage catalyst 17 where the concentration of carbon monoxide will be significantly lowered, the generation of $NO_x$ will be substantially limited, and the concentration of ammonia can be optionally reduced. In an embodiment, the carbon monoxide content of exhaust gas which passes through the second stage catalyst 17 is reduced by 99%. In an embodiment, the carbon monoxide content of exhaust gas that passes through the second stage catalyst 17 is reduced to less than 8.3 ppm corrected to 15% oxygen. Next, the exhaust optionally passes through Catalyst 2B 18 before being directed to the outlet.

In an embodiment, the oxygen concentration of exhaust gas downstream of the injection point 15 is intermittently less than 0.21%. In an embodiment, the concentration of $NO_x$ in the treated exhaust gas that exits the second stage catalyst 17 is less than 3.7 parts per million (ppm) corrected to 15% oxygen and the concentration of CO in the treated exhaust that is exits the second stage catalyst 17 is less than 8.3 ppm at 15% oxygen based on time-average data taken over an extended period. In an embodiment, the concentration of CO in the treated exhaust gas that exits the second stage catalyst 17 is less than 6.7 ppm at 15% oxygen based on time-average data taken over an extended period. In an embodiment, the concentration of CO in the treated exhaust gas that exits the second stage catalyst 17 is less than 5.0 ppm at 15% oxygen based on time-average data taken over an extended period. In an embodiment, the concentration of ammonia in the treated exhaust gas that exits the second stage 17 catalyst is less than 3.0 ppm corrected to 15% oxygen based on time-average data taken over an extended period. In an embodiment, the concentration of ammonia in the treated exhaust gas that exits the second stage catalyst 17 is less than 2.0 ppm corrected to 15% oxygen. An embodiment may set the BACT or TBACT standard for ammonia emissions. TBACT is BACT for toxic compounds.

In further detail, still referring to the embodiment in FIG. 1, the internal combustion engine 10 may comprise a rich burn spark ignited engine. The engine 10 may drive a generator, an automobile, a pump or other devices known to those skilled in the art. The engine 10 may have an air to fuel ratio controller (AFRC) for controlling the air-fuel mixture or other device known to those skilled in the art. The fuel utilized by the engine 10 can be natural gas, propane, butane, biogas, or mixtures of those gases. In an embodiment, the fuel utilized by the engine 10 is gasoline. In an embodiment, air to fuel ratio is controlled by a system utilizing a Venturi mixer and an electronically controlled valve. In an embodiment, the air fuel ratio of the engine is dithered. In an embodiment, dithering consists of cycling the engine air to fuel ratio such that more oxygen is available for combustion for a period of less than 3.5 seconds followed by adjusting the air to fuel ratio such that less oxygen is available for combustion for a period less than 3.5 seconds. The richer and leaner periods are of equal or nearly equal time and are cycled about a set point. In an embodiment, one full dithering cycle lasts 5 seconds or 2.5 seconds with more fuel and 2.5 seconds with less fuel. Dithering the engine air to fuel ratio can reduce the content of ammonia exiting the first stage catalyst. In an embodiment, the first stage catalyst 11 contains platinum, palladium and/or rhodium or mixtures thereof. In an embodiment, the first stage catalyst 11 contains platinum, palladium, rhodium, and/or cerium oxides or mixtures thereof. In an embodiment, the second stage catalyst 17 contains platinum, palladium and/or rhodium or mixtures thereof. In an embodiment, the second stage catalyst 17 contains platinum, palladium, rhodium, and/or cerium oxides or mixtures thereof. Embodiments may contain suitable catalysts known to those skilled in the art.

In an embodiment, oxygen containing gas injection is briefly ceased at a frequency of every 0.4 to 40 seconds. In an embodiment, oxygen containing gas injection is ceased for 0.5 seconds or less. In an embodiment, oxygen containing gas injection is ceased for 0.8 seconds or less. In an embodiment, oxygen containing gas injection is ceased at a frequency of every 40 seconds to 15 minutes. In an embodiment, the oxygen containing gas injection is ceased at a frequency of every 1 second to 3.5 seconds. In an embodiment, oxygen containing gas injection may be synchronized with dithering of the engine air-fuel mixture if dithering is employed. In an embodiment, the oxygen injection at the injection point is briefly ceased when the dither cycle is in the richer, or less oxygen enriched, of the two phases. In an embodiment, the timing of the oxygen injection at the injection point and the timing of the dither cycle are controlled such that they are optimal for removal of $NO_x$ and carbon monoxide at the outlet of the second stage catalyst. The magnitude of oscillation or fluctuation of oxygen concentration in the exhaust gas as a result of dithering the engine air-fuel ratio can be muted, dampened or substantially eliminated after the first stage catalyst 11 due to the oxygen storing ability of the first stage catalyst 11. In an embodiment, cerium oxides can store oxygen during lean, or excess oxygen, periods and release oxygen during rich, or oxygen limited, periods. Therefore, modulating or periodically discontinuing oxygen injection after the first stage catalyst 11 can result in alternating periods of lean or excess oxygen and rich, or oxygen limited periods in the second stage catalyst 17. Alternating between periods of substantially limited oxygen and excess oxygen allows cerium oxides to more readily catalyze the oxidation of carbon monoxide to carbon dioxide or catalyze this reaction at a faster rate.

In an embodiment, the oxygen enrichment process 14 is ceased during cleaning periods or during periods preceding engine shutdown in order to encourage decomposition of sulfur compounds on the second stage catalyst 17. In an embodiment, there are multiple injection points 15. In an embodiment, an oxygen sensor is placed upstream of the first stage catalyst. An oxygen sensor may be used to monitor and/or control the amount of oxygen injection at the injection point. In an embodiment, an oxygen sensor is placed upstream of the first stage catalyst 11 and a second oxygen sensor is placed downstream of the inter-catalyst stage 13. In an embodiment, an oxygen sensor is placed upstream of the first stage catalyst 11 and a second oxygen sensor is placed after the first stage catalyst 11 and upstream of the second stage catalyst 17. In an embodiment, oxygen sensors can send signals to an engine control device known to those skilled in the art. In an embodiment, the engine control device controls the air to fuel ratio of the engine.

The exhaust cooling process 16 could be accomplished by a heat exchanger, water spray, cooling fins or other means know to those skilled in the art. The means for the exhaust cooling process 16 do not increase the oxygen content of exhaust gas. The oxygen enrichment process 14 could be accomplished by injecting air, oxygen containing exhaust gas, gaseous oxygen mixtures, liquid oxygen, mixtures of those gases or other means known to those skilled in the art. For example, the exhaust gas is enriched with oxygen by allowing it to pass through an air injection chamber located between the first stage catalyst 11 and the second stage catalyst 17.

Figure 2:
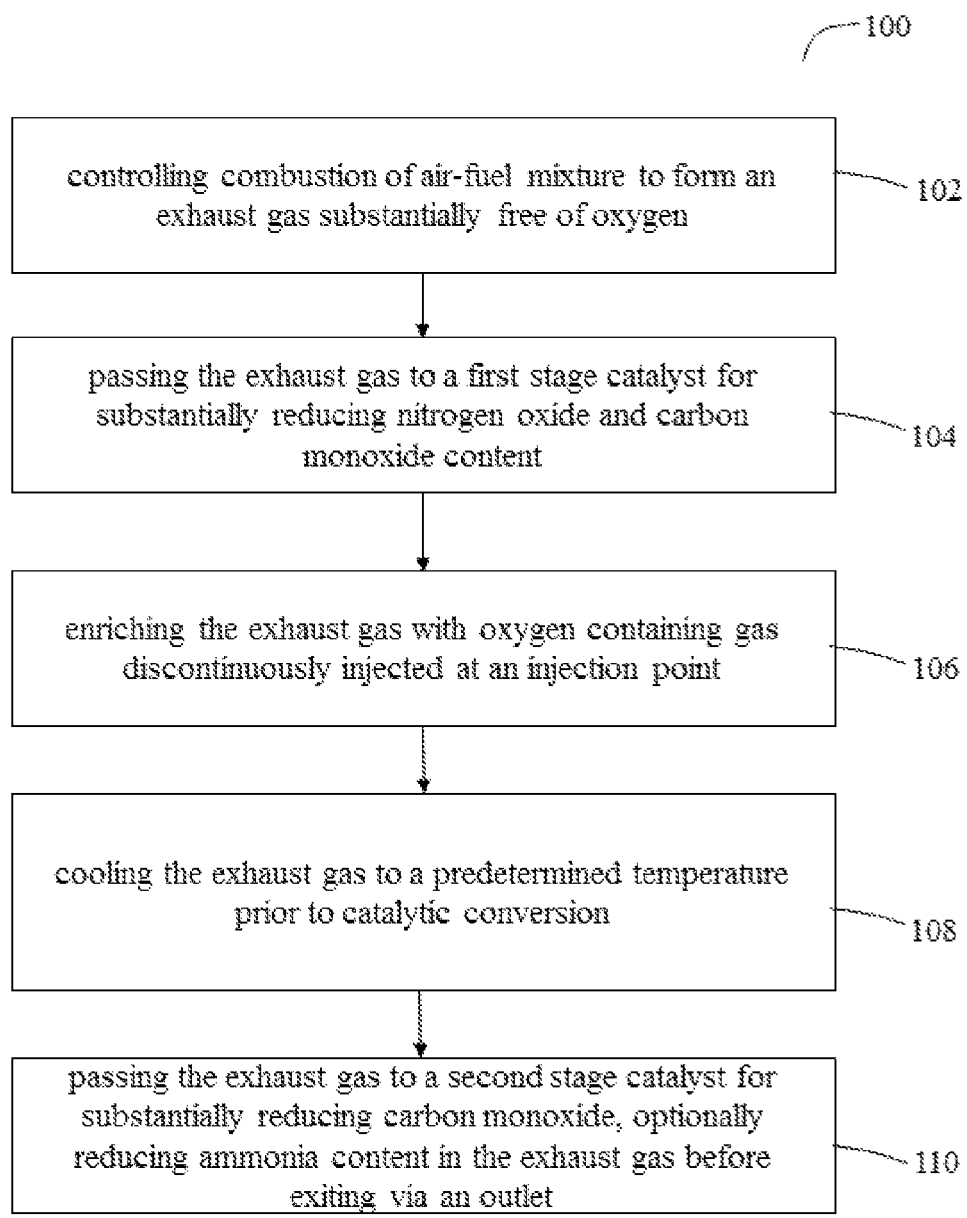
FIG. 2 is a flow diagram illustrating an embodiment of a treatment method for an exhaust gas.

FIG. 2 is a flowchart illustrating an example method 100 for treating an exhaust gas from an internal combustion engine. The method 100 comprises the steps of: (a) controlling combustion of air-fuel mixture to form an exhaust gas substantially free of oxygen, as shown in step 102; (b) passing the exhaust gas to a first stage catalyst for substantially reducing nitrogen oxide ($NO_x$) and carbon monoxide, as shown in step 104; (c) enriching the exhaust gas from step 104 with oxygen containing gas injected discontinuously at an injection point, as shown in step 106; (d) cooling the exhaust gas to a predetermined temperature prior to catalytic conversion, as shown in step 108; and (e) passing the exhaust gas from step 108 to a second stage catalyst for substantially reducing carbon monoxide and optionally reducing ammonia content in the exhaust gas, before exiting via an outlet, as shown in step 110. The method optionally comprises the step of passing the exhaust gas from first stage catalyst 11 to catalyst 1B and passing the exhaust gas from second stage catalyst 17 to catalyst 2B before exiting via the outlet. In an embodiment, ammonia content is reduced if the exhaust gas temperature is above 500 degrees Fahrenheit when the exhaust gas enters the second stage catalyst 17. In some cases, it may not be desirable to reduce the ammonia content because it can generate $NO_x$. Therefore, ammonia content is reduced optionally from exhaust gas in the second stage catalyst 17.

The advantages of the present invention include, without limitation, preservation of the catalytic activity of noble metals contained in the first and second stage catalysts such as platinum, palladium, and rhodium. Intermittently lowering the oxygen concentration lowers the oxidation state of the noble metals and increases their activity. Periodically discontinuing or oscillating oxygen injection by the oxygen enrichment process results in cerium oxides more readily catalyzing the oxidation of carbon monoxide to carbon dioxide or catalyzing this reaction at a faster rate in the second stage catalyst 17. An intermittent atmosphere with reductive or less oxidative properties will encourage the decomposition of sulfates or sulfur compounds allowing their removal from the second stage catalyst 17. Since sulfur has been identified as a cause of catalyst deactivation, the ability to remove sulfur compounds is significant. Sulfur removal can allow the present invention to prolong catalyst life. Oscillating, varying, or modulating oxygen enrichment may also increase the availability of potentially limiting chemical species. Catalyst removal efficiencies are a result of competition of different species for oxygen, active sites on a catalyst and oxidizable components.

Lastly, the present invention minimizes the generation of $NO_x$ that can be generated when ammonia interacts with the surface of the second stage catalyst 17 and is oxidized. The present invention can substantially reduce the concentration of ammonia in gas released to the atmosphere. Ammonia emissions can be so low as to set the BACT or TBACT emission standard for ammonia. Ammonia emissions can be lower than can be obtained by most SCR systems over a prolonged period. Generation of $NO_x$ in the second stage catalyst 17 of most prior art systems is a cause of higher $NO_x$ emissions for the prior art. Ammonia, which can be oxidized to $NO_x$ on the second stage catalyst 17 is a cause of $NO_x$ generation in prior art systems. The catalytic removal of carbon monoxide in the second stage catalyst 17 is so substantial that it allows an engine to operate in compliance with emission limits over a substantially wider range of air to fuel ratios. Overall, the process results in significant reductions of nitrogen oxides, carbon monoxide, and hydrocarbons in exhaust.

In the described embodiments oxygen-containing gas is discontinuously injected into the exhaust gas after the first stage catalyst 11. Intermittently, the second stage catalyst 17 is exposed to oxygen content less than 0.24%. Periodically lowering the oxygen content in exhaust gas passed to the second stage catalyst 17 lowers the oxidation state of noble metals such as platinum, palladium and rhodium on the second stage catalyst 17 to more active states. Periodically discontinuing or oscillating oxygen injection by the oxygen enrichment process results in cerium oxides more readily catalyzing the oxidation of carbon monoxide to carbon dioxide or catalyzing this reaction at a faster rate in the second stage catalyst 17. Intermittent or continuous exposure of the second stage catalyst 17 to an atmosphere with less oxygen content can encourage the decomposition of sulfur compounds on the second stage catalyst 17. The removal of sulfur compounds can extend catalyst life. Sulfur has been reported to deactivate catalysts in installations with oxygen enrichment consistently above 0.25% at the second stage catalyst 17. The present invention takes advantage of the oxygen storing capacity of catalysts. Varying oxygen injection can also increase the availability of potentially limiting species. Lowering oxygen content in the second stage catalyst 17 can discourage strongly adsorbed oxygen molecules on the second stage catalyst 17 surface from blocking other species from the catalyst surface. Rhodium is particularly sensitive to deactivation in an oxidizing environment.

In a broad embodiment, the present invention is a provision of assemblies and methods to preserve or enhance catalytic activity, reduce air contaminants in the final exhaust and reduce the generation of $NO_x$ on a second stage catalyst.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A method for treating an exhaust gas discharged from a rich-burn, spark ignited engine, the method comprising the steps of:
    (a) controlling combustion of air-fuel mixture to produce an exhaust gas that is substantially free of oxygen;
    (b) passing the exhaust gas from the engine to a first stage catalyst for substantially reducing nitrogen oxide (NOx) and carbon monoxide concentration in the exhaust gas;
    (c) passing the exhaust gas resulting from step (b) to an inter-catalyst stage having
        (i) an oxygen enrichment process wherein oxygen containing gas is discontinuously injected at an injection point into the exhaust gas, and
        (ii) an exhaust cooling process wherein the exhaust gas is cooled to a predetermined temperature for inhibiting the generation of NOx in the second stage catalyst; and
    d) passing the exhaust gas resulting from step (c) to a second stage catalyst for substantially reducing carbon monoxide concentration in the exhaust gas and reducing ammonia concentration in the exhaust gas depending on temperature of exhaust passing through the second stage catalyst, before exiting via an outlet, whereby the concentration of NOx, carbon monoxide, and hydrocarbons in the treated exhaust gas that exits the second stage catalyst is substantially reduced.

2. The method of claim 1, wherein the oxygen content of the exhaust gas downstream of the injection point is intermittently less than 0.24% and not greater than about 1.35% as a result of discontinuous injection of oxygen containing gas.

3. The method of claim 1, wherein an engine control device receives signals from two or more oxygen sensors wherein one oxygen sensor is placed upstream of the first stage catalyst and a second oxygen sensor is placed downstream of the inter-catalyst stage.

4. The method of claim 1, wherein the exhaust cooling process cools the exhaust to a temperature range of 380 to 650 degrees Fahrenheit.

5. The method of claim 1, wherein the generation of NOx by the oxidation of ammonia in the second stage catalyst is substantially limited when second stage exhaust gas temperature is less than 480 degrees Fahrenheit.

6. The method of claim 2, wherein intermittently discontinuing the injection of oxygen containing gas lowers the oxidation state of noble metals, which comprise the second stage catalyst.

7. The method of claim 1, wherein the engine air-fuel ratio is dithered thereby reducing the amount of ammonia exiting the first stage catalyst.

8. The method of claim 7, wherein the concentration of ammonia in the treated exhaust that exits the second stage catalyst is less than 2.0 ppm corrected to 15% oxygen based on time-average data taken over an extended period.

9. The method of claim 2, wherein the injection of oxygen containing gas is briefly ceased at a frequency of every 0.4 to 40 seconds.

10. The method of claim 2, wherein the injection of oxygen containing gas is briefly ceased at a frequency of every 40 seconds to 15 minutes.

11. The method of claim 1, wherein the concentration of NOx in the treated exhaust that exits the second stage catalyst is less than 3.7 ppm corrected to 15% oxygen based on time-average data taken over an extended period.

12. The method of claim 1, wherein the concentration of carbon monoxide in the treated exhaust that exits the second stage catalyst is less than 8.3 ppm corrected to 15% oxygen based on time-average data taken over an extended period.

13. The method of claim 1, wherein the concentration of carbon monoxide in the treated exhaust that exits the second stage catalyst is less than 6.7 ppm corrected to 15% oxygen based on time-average data taken over an extended period.

14. The method of claim 1, wherein the concentration of carbon monoxide in the treated gas that exits the second stage catalyst is less than 5.0 ppm corrected to 15% oxygen based on time-average data taken over an extended period.

15. The method of claim 1, wherein the concentration of carbon monoxide in the treated exhaust exiting the first stage catalyst is less than 625 ppm corrected to 15% oxygen based on time-average data taken over an extended period.

16. The method of claim 2, wherein the exhaust cooling process cools the exhaust to a temperature range of 380 to 500 degrees Fahrenheit.

17. The method of claim 1, wherein the concentration of ammonia in treated exhaust that exits the second stage catalyst is less than 3.0 ppm corrected to 15% oxygen based on time-average data taken over an extended period.

18. The method of claim 1, wherein the oxygen enrichment process comprises injection of oxygen containing gas through a plurality of injection ports.

19. The method of claim 1, wherein the concentration of a precursor for particulate matter is reduced in the exhaust gas exiting the second stage catalyst.

20. The method of claim 1, wherein the air to fuel ratio of the engine is controlled by a system utilizing a venturi mixer and an electronically controlled valve.

21. An apparatus for treating an exhaust gas discharged from a rich-burn, spark ignited internal combustion engine, comprising:
    a first stage catalyst adapted to receive the exhaust gas from the engine and to substantially reduce NOx and carbon monoxide content in the exhaust gas;
    an inter-catalyst stage configured to discontinuously enrich the exhaust gas with oxygen and cool the exhaust to a predetermined temperature prior to catalytic conversion;
    a second stage catalyst adapted to receive the exhaust gas from the inter-catalyst stage and to substantially reduce carbon monoxide content in the exhaust gas; and
    an outlet for allowing the treated exhaust to exit the apparatus,
    whereby the concentration of NOx, carbon monoxide, and hydrocarbons in the treated exhaust gas that exits the second stage catalyst is substantially reduced.

22. The apparatus of claim 21, wherein an engine control device receives signals from two or more oxygen sensors wherein one oxygen sensor is placed upstream of the first stage catalyst and a second oxygen sensor is placed after the first stage catalyst and upstream of the second stage catalyst.

23. A method for limiting the generation of NOx on a second stage catalyst receiving an exhaust gas from a combustion device, the method comprising:
    (i) controlling combustion of air-fuel mixture to produce an exhaust gas that is substantially free of oxygen;
    (ii) providing a least one exhaust cooling stage where the exhaust gas is cooled to a predetermined temperature and at least one air injection stage where the exhaust gas is discontinuously enriched with oxygen before being passed to the second of at least two catalyst stages,
    whereby the generation of NOx in the exhaust gas that passes over the second stage catalyst is substantially limited based on an average of measurements taken over an extended time period.

24. The method of claim 23, wherein an engine control device receives signals from two or more oxygen sensors wherein one oxygen sensor is placed upstream of the first stage catalyst and a second oxygen sensor is placed after the first stage catalyst and upstream of the second stage catalyst.

* * * * *